United States Patent [19]
Dennis et al.

[11] 4,340,958
[45] Jul. 20, 1982

[54] AUTOMATIC RECORD CHANGER

[75] Inventors: James T. Dennis, P.O. Box 15100, Oklahoma City, Okla. 73155; George Kolomayets, Chicago, Ill.

[73] Assignee: James T. Dennis, Oklahoma City, Okla.

[21] Appl. No.: 211,821

[22] Filed: Dec. 1, 1980

Related U.S. Application Data

[60] Division of Ser. No. 9,254, Feb. 5, 1979, Pat. No. 4,291,886, which is a continuation of Ser. No. 813,225, Jul. 5, 1977, abandoned.

[51] Int. Cl.³ .......................... G11B 3/60; G11B 25/04
[52] U.S. Cl. .................................................. 369/267
[58] Field of Search ......................................... 369/267

[56] References Cited

U.S. PATENT DOCUMENTS 3,485,498 12/1969 Smith .................................. 369/267

Primary Examiner—Steven L. Stephan
Attorney, Agent, or Firm—Mason, Kolehmainen, Rathburn & Wyss

[57] ABSTRACT

A record changer mechanism is provided wherein an improved belt shifting arrangement is provided to change the speed at which the turntable of the mechanism is rotated.

2 Claims, 8 Drawing Figures

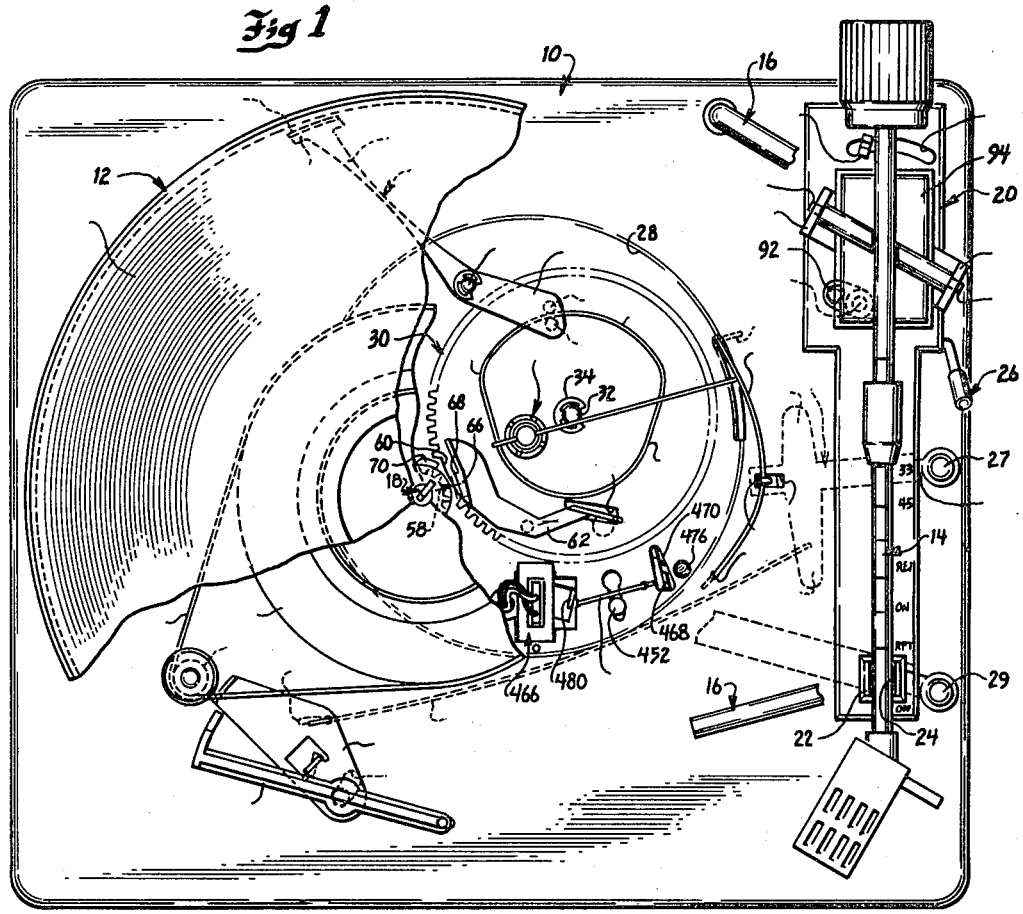
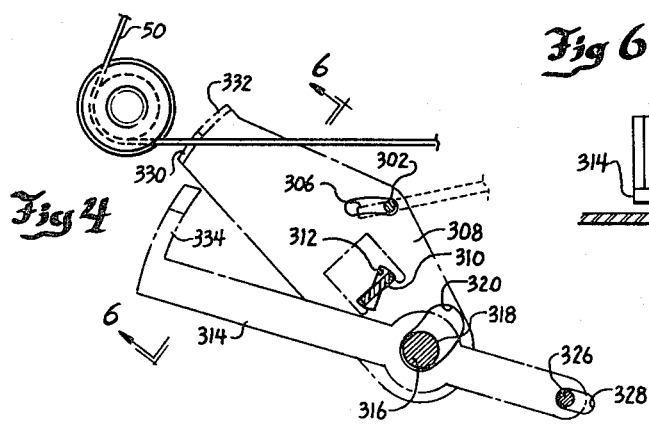
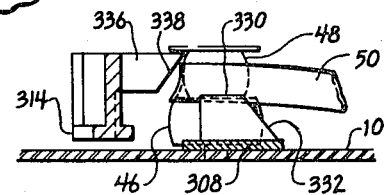

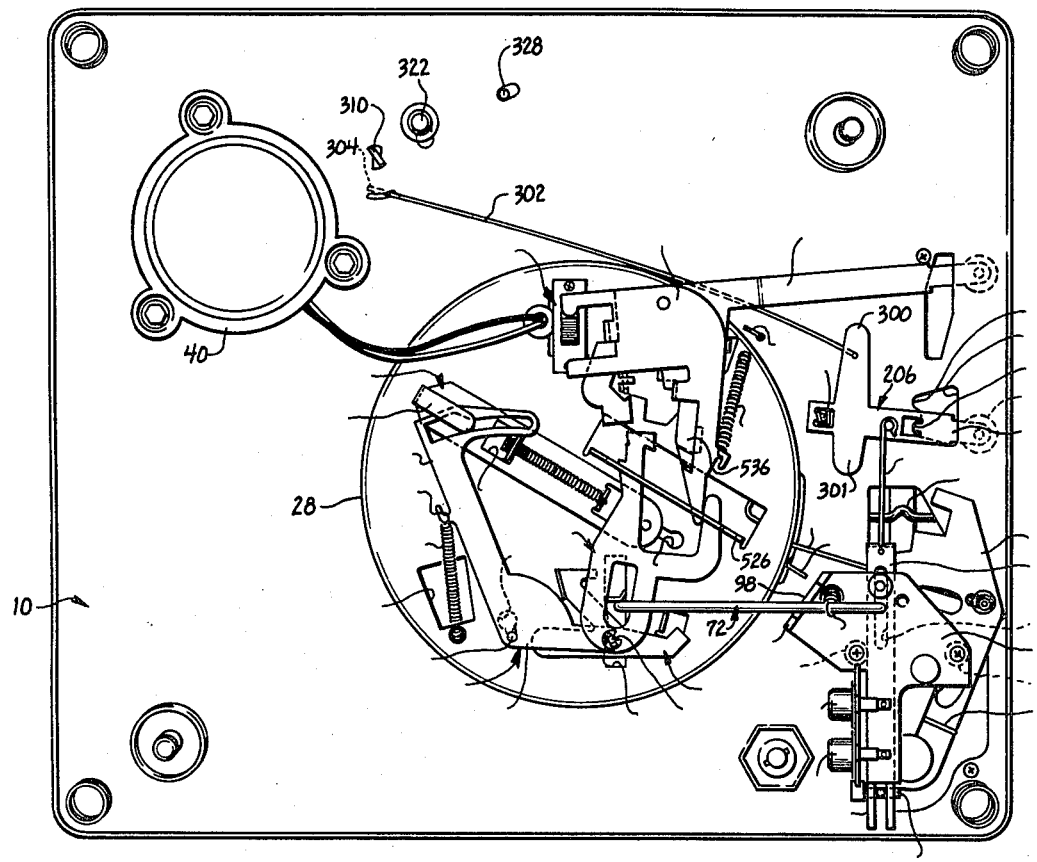
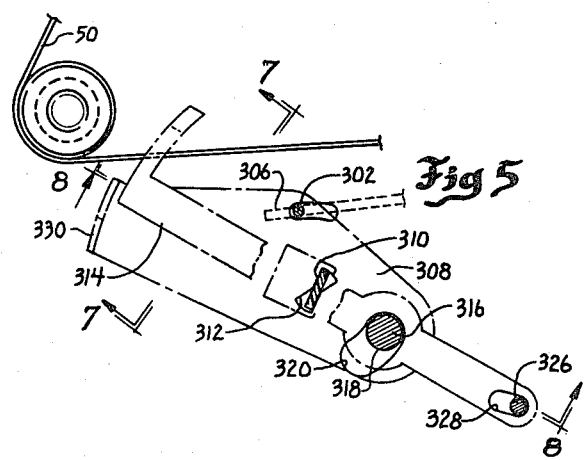

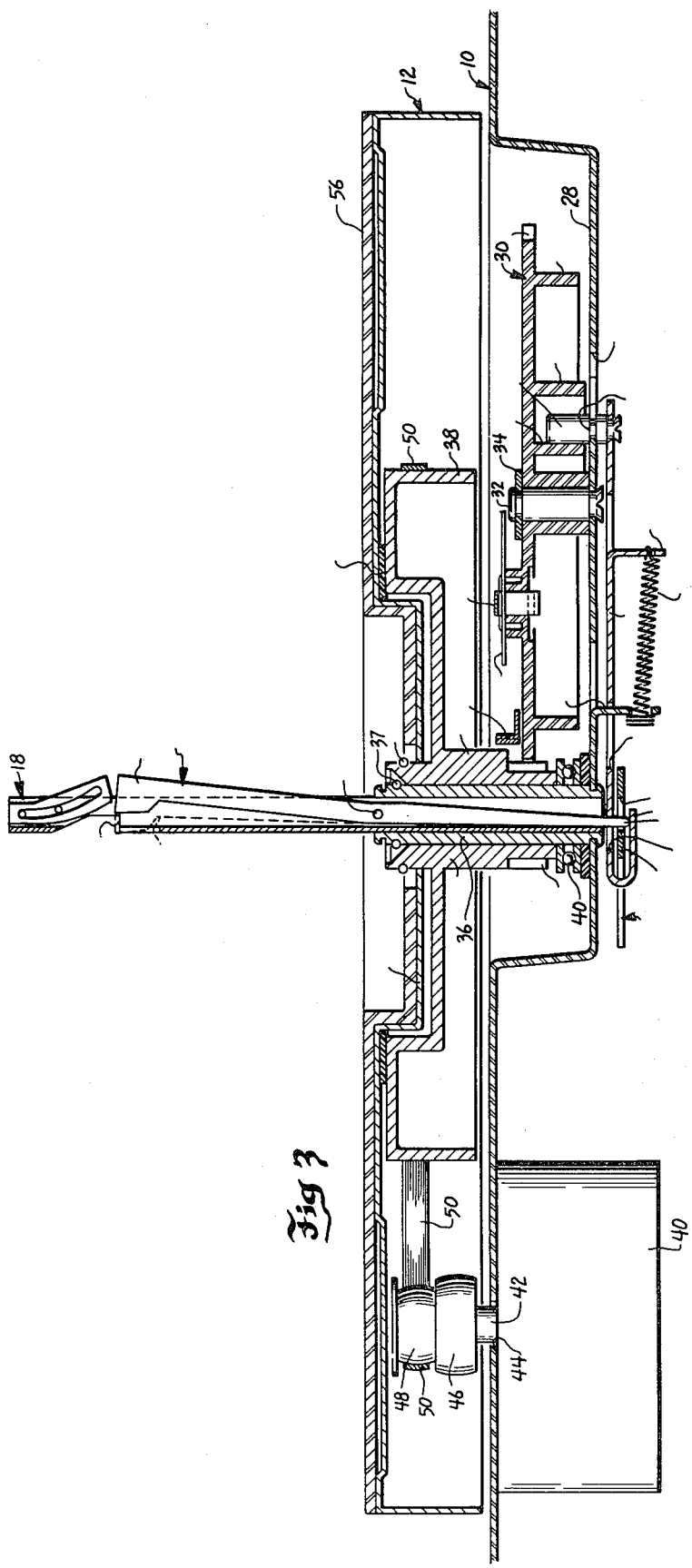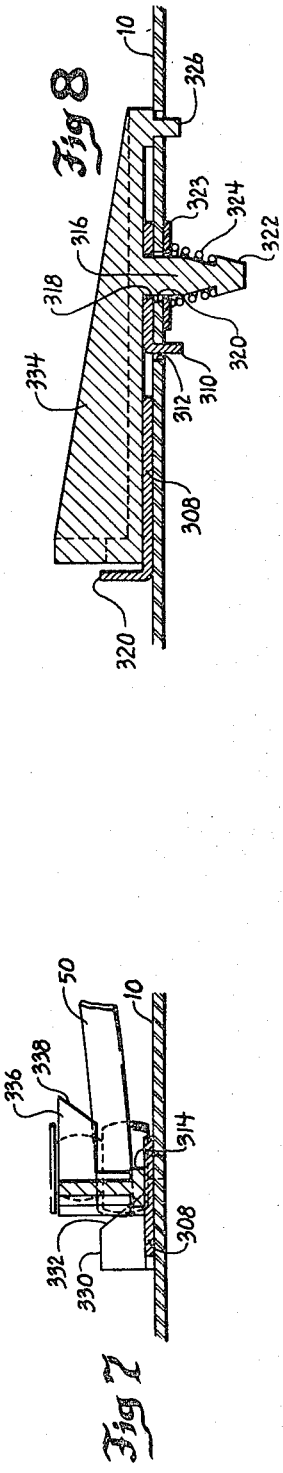

AUTOMATIC RECORD CHANGER

The present invention is a division of my copending application Ser. No. 009,254, filed Feb. 5, 1979, now U.S. Pat. No. 4,291,886 which is itself a continuation of patent application Ser. No. 813,225, filed July 5, 1977, now abandoned.

The present invention relates to record changers, and more particularly, to automatic record changers which are arranged to play a series of phonograph records in the order in which the records are placed on the centering spindle of the record changer.

The invention both as to its organization and method of operation, together with further objects and advantages thereof, will best be understood by reference to the following specification taken in connection with the accompanying drawings.

FIG. 1 is a top plan view of the record changer of the present invention with a portion of the turntable broken away to show a portion of the record changing mechanism;

FIG. 2 is a bottom view of the record changer of FIG. 1;

FIG. 3 is a fragmentary sectional view taken along the lines 5—5 of FIG. 1;

FIG. 4 is a fragmentary plan view taken on a larger scale, showing the speed shift mechanism of the changer of FIG. 1 in the 33 rpm position;

FIG. 5 is a plan view similar to FIG. 4 but showing the speed shift mechanism in the 45 rpm position;

FIG. 6 is a sectional view taken along the line 12B—12B of FIG. 4;

FIG. 7 is a sectional view taken along the line 12C—12C of FIG. 5;

FIG. 8 is a sectional view taken along the line 12D—12D of FIG. 5.

Referring now to the drawings, and more particularly to FIGS. 1 and 2 thereof, the automatic record changer of the present invention is therein illustrated as comprising a metal base plate indicated generally at 10 on which is mounted a rotatable turntable indicated generally at 12, a tone arm indicated generally at 14, and a balance arm indicated generally at 16. The turntable 12 is mounted for rotation about a centering spindle indicated generally at 18 on which a stack of records may be supported and the balance arm 16 moved from its rest position somewhat beyond the position shown in FIG. 1 to a position over the records so that these records are balanced on the record supporting shelf of the spindle 18.

A combined speed and size control knob 27 is provided which in the illustrated embodiment is movable between a 33⅓ rpm position and a 45 rpm position. In the 33⅓ position the tone arm 14 is automatically adjusted to play 12-inch records and in the 45 rpm position the tone arm is automatically adjusted to play 7-inch records.

The base plate 10 is provided with a central depressed portion 28. Most of the parts of the record changing mechanism per se are mounted on the top and bottom of the central depressed base plate portion 28, which is eccentric with respect to the spindle 18 to permit such mounting, thereby eliminating the conventional base plate subassemblies which are normally employed to mount the operative parts of the record changing mechanism. By employing the central base plate portion 28 as a support for the control levers and other parts of the record changing mechanism, the number of parts required is substantially reduced and in addition the amount of time required to assemble these parts in production is also substantially reduced. More particularly, a cycling gear indicated generally at 30 is rotatably mounted on a post 32 which is secured in the central base plate portion 28 and extends upwardly therefrom, the gear 30 being retained on the post 32 by any suitable means such as the C washer 34. A sleeve bearing 36 is mounted in the eccentric portion 28 of the base plate 10 and the spindle 18 is secured within the bearing 36. A turntable hub 38 is rotatably mounted on the sleeve bearing 36 and rests on a thrust bearing indicated generally at 40 which is positioned about the bottom end of the sleeve 36 and rests on the central base plate portion 28. The hub 38 is retained on the bearing 36 by means of the O-ring 37.

In order to drive the turntable hub 38 a turntable driving motor 40 (FIG. 3) is mounted on the underside of the base plate 10 beyond the portion 28 and the shaft 42 thereof extends upwardly through an opening 44 in the base plate 10. A drive thrust having a 45 rpm step 46 and a 33 rpm step 48 is mounted on the shaft 42 above the base plate 10 and a flexible belt 50 is employed to interconnect one of the turret steps 46, 48 with the turntable hub 38, the belt 50 riding on the periphery of the hub 38.

RECORD SPEED SELECTION

Considering now the manner in which the belt 50 is shifted from the turret 48 to the turret 46, and vice versa, in accordance with movement of the speed-size control lever 206, the lever 206 is provided with an offset arm portion 300 (FIG. 2) to the end of which is secured a control wire 302. The lever 206 is also provided with an arm 301, extending in the opposite direction from the arm 300, which rides on the under surface of the base plate 10 and prevents the lever 206 from twisting as it is moved between the 33⅓ rpm and 45 rpm positions. The wire 302 extends beneath the base plate 10, around the depressed central base plate portion 28 thereof and extends upwardly through an elongated slot 304 formed in the base plate 10. The control wire 302 is provided with an offset end portion 306 (FIG. 4) which extends through an opening in a first control plate 308 which is pivotally mounted on the upper side of the base plate 10. More particularly, the plate 308 is provided with a downturned flange 310 which is positioned in a bow-tie-shaped opening 312 in the base plate 10. A second speed control member 314 is pivotally mounted on the plate 308 by means of a downwardly extending post portion 316 on the member 314 which extends through a circular bearing hole 318 in the plate 308 and through an elongated arcuate slot 320 in the base plate 10. The stud 316 is formed with a head portion 322 which retains a coil spring 324 positioned between the head 322 and a washer 323 on the underside of the base plate 10. While the members 308 and 314 are pivotally interconnected by means of the stud 316, this stud may itself move within the slot 320. However, the member 314 is also provided with a guide post 326 which extends through an elongated slot 328 in the base plate 10.

The control plate 308 is provided with an upstanding flange 330 which includes an inclined shoulder portion 332. The shoulder portion 332 is adapted to engage the belt 50, when the belt is riding on the 45 rpm turret 46, and urge the belt 50 upwardly into engagement with the 33 rpm turret 48 when the control lever 27 is moved from the 45 to the 33 rpm position. The control member 314 is provided with a vertically extending flange portion 334 which terminates in a curved offset end portion 336 the outer edge of which is formed to provide an inclined shoulder 338.

When the control knob 27 is moved from the 33 rpm position shown in FIG. 1 to the 45 rpm position shown in FIG. 5 the resultant movement of the arm portion 300 of the lever 206 moves the wire 302 so that the control plate 308 and control member 314 are moved in a scissors type action from the position shown in FIG. 1 to the position shown in FIG. 5. In so doing the flange portion 330 of the control plate 308 is first moved away from the belt 50 after which the flange portion 336 is moved into engagement with the belt 50 which is running on the turret 48 and the inclined shoulder portion 338 of the member 314 forces the belt downwardly over the 45 rpm turret 46 as the control plate 308 continues to move outwardly away from the belt 50 to the position shown in FIG. 4. In a similar manner when the control knob 27 is moved from the 45 rpm position to the 33 rpm position, the flange portion 336 of the member 314 is first moved back away from the belt 50 after whih the inclined shoulder 332 of the control plate 308 engages the belt 50 and shifts it upwardly to the 33 rpm turret 48.

While the provision of the common control knob 27 to select size and speed has certain advantages, it is also possible to control record size selection and turntable speed selection by separate controls. This modification may be very easily accomplished with the arrangement of the present invention by connecting the wire 302 to a separate control knob which may be located at any desired location on the base plate 10, such as in the front right hand corner of the base plate. The control knob 27 then acts solely as a size selector to select the desired record diameter.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a record player of the type provided with a turntable having a flange for engagement with a drive belt and a pair of drive pulleys of different diameter, which are adjacent and coaxially mounted on a drive shaft, a belt shifting arrangement of shifting said belt from one pulley to the other comprising a support member, a first member pivotally mounted on said support member and movable between first and second positions, said first member having an inclined portion adapted to engage one side of said drive belt and shift belt from a first one of said pulleys to the second pulley when said first member is moved to said first position, a second member pivotally mounted on said support member and interconnected with said first member at a point between the respective pivot points of said first and second members so that said first and second members pivot in opposite directions in response to movement of said first member between said first and scond positions, said second member having an inclined portion adapted to engage said drive belt and shift said belt from said second pulley to said first pulley when said first member is moved from said first position to said second position.

2. The arrangement of claim 1, wherein said inclined portions of said first and second members are adapted to engage the same side of said drive belt and shift said belt between said first and second pulleys upon movement of said first member between said second and first positions.

* * * * *